United States Patent
Meister et al.

(10) Patent No.: US 9,195,112 B2
(45) Date of Patent: Nov. 24, 2015

(54) ELECTRO-OPTIC MODULATOR

(75) Inventors: Stefan Meister, Berlin (DE); Aws Al-Saadi, Berlin (DE); Hans Joachim Eichler, Berlin (DE); Bulent Franke, Berlin (DE); Lars Zimmermann, Berlin (DE); Bernd Tillack, Frankfurt (DE)

(73) Assignees: TECHNISCHE UNIVERSITÄT BERLIN, Berlin (DE); IHP GMBH—INNOVATIONS FOR HIGH PERFORMANCE MICROELECTRONICS, Frankfurt (DE)

( * ) Notice: Subject to any disclaimer, the term of this patent is extended or adjusted under 35 U.S.C. 154(b) by 147 days.

(21) Appl. No.: 14/004,354

(22) PCT Filed: Mar. 2, 2012

(86) PCT No.: PCT/DE2012/200012
§ 371 (c)(1),
(2), (4) Date: Nov. 7, 2013

(87) PCT Pub. No.: WO2012/122981
PCT Pub. Date: Sep. 20, 2012

(65) Prior Publication Data
US 2014/0241656 A1   Aug. 28, 2014

(30) Foreign Application Priority Data
Mar. 11, 2011 (DE) .......................... 10 2011 005 422

(51) Int. Cl.
*G02F 1/035* (2006.01)
*G02F 1/225* (2006.01)
(Continued)

(52) U.S. Cl.
CPC .............. *G02F 1/2257* (2013.01); *G02F 1/015* (2013.01); *G02F 1/025* (2013.01); *G02F 1/218* (2013.01); *G02F 2001/0152* (2013.01); *G02F 2001/0155* (2013.01); *G02F 2001/213* (2013.01)

(58) Field of Classification Search
CPC ....... G02F 1/025; G02F 1/035; G02F 1/0356; G02F 1/225; G02F 1/2255; G02F 1/015; G02F 1/218; G02F 1/2257
USPC .......................................................... 385/2
See application file for complete search history.

(56) References Cited

U.S. PATENT DOCUMENTS

| | | | |
|---|---|---|---|
| 4,790,635 A | 12/1988 | Apsley | |
| 2005/0064111 A1* | 3/2005 | Hiller | ............................ 427/595 |
| 2009/0263078 A1 | 10/2009 | Hosomi et al. | |

FOREIGN PATENT DOCUMENTS

WO   WO-2007/141956 A1   12/2007

OTHER PUBLICATIONS

Liu et al.; High-speed optical modulation based on carrier depletion in a silicon waveguide Optics Express 660; vol. 15, No. 2; Jan. 22, 2007; 9 pages.

(Continued)

*Primary Examiner* — Jerry Blevins
(74) *Attorney, Agent, or Firm* — Foley & Lardner LLP

(57) ABSTRACT

An electro-optic modulator for the modulation of optical radiation of a predetermined wavelength, the electro-optic modulator having at least one optical resonator in which a standing optical wave can be formed for the predetermined wavelength. In the resonator, at least two doped semiconductor sections—as seen in the longitudinal direction of the resonator—are arranged at a distance from one another, and the at least two doped semiconductor sections respectively lie locally at an intensity minimum of the standing optical wave.

8 Claims, 5 Drawing Sheets

Figure 1:
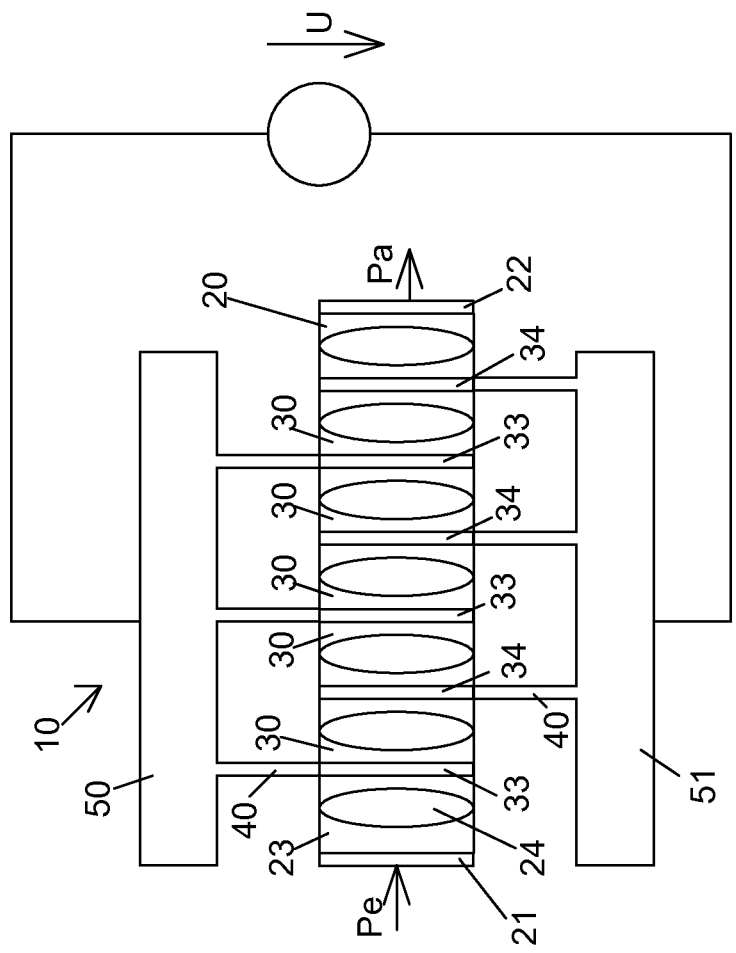

(51) Int. Cl.
*G02F 1/025* (2006.01)
*G02F 1/015* (2006.01)
*G02F 1/21* (2006.01)

(56) References Cited

OTHER PUBLICATIONS

Foresi et al.; Photonic-bandgap microcavities in optical waveguides; Letters to Nature; vol. 390; Nov. 13, 1997; pp. 143-145.
Green et al.; Ultra compact, low RF power, 10 Gb/s silicon Mach-Zehnder modulator; Optics Express 17106; vol. 15, No. 25, Dec. 10, 2007; 8 pgs.
International Preliminary Report on Patentability; PCT/DE2012/200012; Sep. 12, 2013; 8 pgs.
Xu et al.; Micrometre-scale silicon electro-optic modulator; Nature Publishing Group, vol. 435; May 19, 2005; pp. 325-327.
Reed et al.; Silicon optical modulators; Nature Photonics, vol. 4; Aug. 2010 (published online Jul. 30, 2010); pp. 518-526.
Schmidt et al.; Compact electro-optic modulator on silicon-on-insulator substrates using cavities with ultra-small modal volumes; Optics Express 3140; vol. 15, No. 6, Mar. 19, 2007; 9 pgs.
Soref et al.; Electrooptical Effects in Silicon; IEEE Journal of Quantum Electronics, vol. QE-23, No. 1; Jan. 1987; pp. 123-129.
International Search Report and Written Opinion; PCT/DE2012/200012; Feb. 8, 2013; 7 pages.
Zhi-Young Li et al; "Silicon waveguide modulator based on carrier depletion in periodically interleaved PN junctions", Optics Express, vol. 17, No. 18, Aug. 31, 2009; 12 pgs.

* cited by examiner

ELECTRO-OPTIC MODULATOR

The invention relates to an electro-optic modulator having the features according to the precharacterizing clause of patent claim 1.

In the scope of the description below, the term "light" will be used to mean any optical radiation, irrespective of whether the optical radiation is or is not visible to humans. The terms "light" or "optical radiation" therefore include, for example, ultraviolet radiation or infrared radiation. The same applies for the term "light waveguide", which is meant to be a waveguide for optical radiation.

For the modulation of optical signals in connection with waveguides, there are many fields of application, for example in communication, sensor technology, image transmission etc. Particularly electro-optic modulators integrated in semiconductor materials (for example silicon, InP, GaAs) have a significant role in this case. Electro-optic modulators based on silicon waveguides are gaining increasing importance, since they represent a key component for optical broadband transmission for so-called on-chip, chip-to-chip, chip-to-board communication etc. With optical connections, substantially higher bandwiths can be achieved with moderate energy consumption, compared with the previously conventional metal-based connections.

Various designs for light modulator components for such transmission paths are known. In telecommunication with high data rates, for example, Mach-Zehnder modulators are often used. In waveguide-based Mach-Zehnder modulators (Liu et al. Optics Express, 15, 660, 2007) the light travels through an electro-optic material in at least one branch of the modulator. The refractive index (or the absorption) of the electro-optic material can be varied by applying a voltage. As a result, the light wave in this branch experiences a phase shift. If the phase shift is $\pi$ (or an integer multiple of $\pi$) relative to the light wave which travels through the other branch of the modulator, extinction takes place during superposition of the two waves. In order to achieve a phase shift of $\pi$, the light must travel a path distance, usually in the millimeter to centimeter range, in the electro-optic material. The minimum structural length of a Mach-Zehnder modulator is correspondingly large.

Furthermore, ring resonators are also used for the modulation of optical signals (Xu et al. Nature, 435, 325, 2005). The structural sizes of ring resonators are substantially less than in the case of Mach-Zehnder modulators since, owing to the high number of circuits of the light in the resonator, the required path distance in the electro-optic material is substantially less (for comparable electro-optic coefficients).

Schmidt et al. (Optics Express, 16, 334, 2008) has demonstrated an electro-optic modulator which is based on a Fabry-Perot structure that was produced using a so-called one-dimensional photonic crystal (see also Foresi et al. (Nature, 390, 143, 1997)). In this case, the electro-optic region was produced using a p-i-n doped region which is switched by charge carrier injection. With this modulator, however, only modulation frequencies of 250 MHz can be achieved.

In order to generate the electro-optic effect, regions in or close to the waveguide in the semiconductor material are doped. Thus, in silicon-on-insulator (SOI) waveguides, for example, a p-i-n or p-n diode structure is generated by doping (Reed et al., Nature Photonics, 4, 518, 2010). With the aid of this structure, the charge-carrier concentration in the waveguides can be modified. Thus, by the so-called free carrier plasma dispersion effect, the refractive index and the absorption in the waveguide are modified (Soref et al., IEEE J. Quant. Electrn., 23, 123, 2004). In this case, by applying a voltage to the diode in the forward direction, charge carriers are injected into the waveguide (so-called injection), or by applying a voltage to the diode in the reverse direction charge carriers are extracted from the waveguide (so-called depletion). It is known that, by extraction of the charge carriers (depletion), higher modulation speeds can be achieved than by the injection of charge carriers.

In the case of electro-optic light modulators according to the "injection" principle, the p- and n-doped regions are configured close to the waveguide, while the core region of the waveguide remains generally undoped (or very lightly doped). Owing to the distance of the doped regions from the waveguide, absorptive losses are low and heavy dopings can be configured. With heavily doped p-i-n structures, high electro-optic effects can be achieved. In (Green et al., Opt. Express, 15, 17106, 2007), the p- and n-doping is respectively $10^{20}$ cm$^{-3}$, and refractive index changes of $4*10^{-3}$ are therefore achieved. With higher refractive index changes and higher electro-optic effects, shorter modulator lengths or resonator lengths can be produced.

In the case of electro-optic light modulators according to the depletion principle, the waveguide core itself is p- and/or n-doped. Owing to the configuration of the doped regions inside the waveguide core, the absorptive losses are relatively high, so that only light dopings can be configured. The modulation of the light is carried out by reduction of the charge carriers in the light waveguide.

It is an object of the invention to provide an electro-optic modulator in which a high modulation effect can be achieved together with comparatively low optical attenuation.

This object is achieved according to the invention by an electro-optic modulator having the features according to patent claim 1. Advantageous configurations of the electro-optic modulator according to the invention are specified in the dependent claims.

Correspondingly, according to the invention, in the resonator, at least two doped semiconductor sections—as seen in the longitudinal direction of the resonator—are arranged at a distance from one another, the at least two doped semiconductor sections respectively lying locally at an intensity minimum of the standing optical wave.

An essential advantage of the electro-optic modulator according to the invention resides in the fact that the two doped semiconductor sections, which are arranged in the resonator, can be doped relatively heavily so that a relatively strong electro-optic effect can be achieved in the resonator. Additional attenuation of the light propagating in the resonator is not however induced by the doped semiconductor sections, or at least only to a negligible extent, since according to the invention in particular the doped semiconductor sections respectively lie at an intensity minimum of the standing optical wave in the resonator. The concept according to the invention is thus that, owing to the arrangement of the doped semiconductor sections in the region of the intensity minima, additional attenuation by the doped semiconductor sections is avoided since these are so to speak "optically" not seen by the wave propagating in the resonator. This makes it possible to provide relatively heavy dopings in the doped semiconductor sections, so that—depending on the driving of the electro-optic modulator—a relatively large electro-optic effect can be induced in the resonator. By modifying the refractive index in the resonator, for example, the resonator wavelength of the resonator can be shifted and the transmission and/or reflection of the resonator can therefore be influenced, so that for example an optical switching effect can be induced.

According to a particularly preferred configuration of the invention, a light waveguide consisting of semiconductor material is present in the resonator, the longitudinal direction of the light waveguide extends along the longitudinal direction of the resonator, and the at least two doped semiconductor sections are respectively formed by a doped semiconductor section of the light waveguide. By virtue of a light waveguide whose longitudinal direction coincides with the longitudinal direction of the resonator, light waveguiding between the resonator ends of the resonator can be achieved in a straightforward way. At the same time, the semiconductor material of the light waveguide can be used for formation of the at least two doped semiconductor sections, with which electro-optic modulation of the resonator is induced.

In order to minimize the light waveguide attenuation in the light waveguide, it is regarded as advantageous for all doped semiconductor sections of the light waveguide to lie exclusively at intensity minima of the standing optical wave.

It is furthermore regarded as particularly advantageous for one of the at least two doped semiconductor sections to be p-doped and the other n-doped, and for the doped semiconductor sections to form a pn or pin diode, the "doping sequence" of which extends along the longitudinal direction of the resonator. With the aid of a pn or pin diode structure, the charge-carrier density between the doped semiconductor sections, that is to say where the intensity maxima of the standing optical wave lie in the resonator, can be increased or decreased in a very straightforward way, so that for example a shift of the resonant frequency of the resonator and therefore modulation of the light guided in the waveguide can be induced.

Preferably, the refractive index and/or the absorption and/or the charge-carrier density between the at least two doped semiconductor sections can be increased or reduced, and the optical behavior of the resonator can therefore be adjusted, by applying an electrical voltage to the at least two doped semiconductor sections.

The resonator boundaries of the resonator are preferably respectively bounded by a mirror section. The mirror sections may respectively be formed by mirror layers. It is, however, regarded as particularly advantageous for at least one of the mirror sections to be formed by a light waveguide section in which there are holes.

In addition or as an alternative, at least one of the mirror sections may be formed by a light waveguide section whose width and/or height varies. Both holes and a width and/or height variation may be introduced by lithography and/or by etching methods, without additional materials being required in order to form the mirror sections, and so production of the mirror sections is possible very economically and at the same time very reproducibly.

In a particularly preferred configuration of the modulator, the electro-optic modulator comprises a light waveguide consisting of semiconductor material, which forms a first mirror section of the resonator with a first section, is arranged inside the resonator with a second section, and forms a second mirror section of the resonator with a third section. In this configuration, a waveguide is thus passed through the resonator, modulation of the light taking place in the region of the second section, or in the region of the resonator.

The light waveguide material is preferably silicon, since silicon is the commercially dominant semiconductor material. For production of the modulator and of the light waveguide, so-called SOI (SOI: silicon on insulator) material is particularly preferably used, which is widespread in electronics and with which optical light waveguides that guide very well can be produced relatively straightforwardly owing to the refractive index discontinuity with the buried silicon oxide layer.

With a view to simple contacting of the doped semiconductor sections, it is regarded as advantageous that, in the resonator, a multiplicity of doped semiconductor sections—as seen in the longitudinal direction of the resonator—are arranged at a distance from one another, and that the doped semiconductor sections are contacted by comb-like conductor tracks of doped semiconductor material, which respectively extend away from an intensity minimum of the standing optical wave of the light waveguide, preferably perpendicularly. The doping type (n or p doping) of the comb-like conductor tracks is preferably respectively identical to the doping type of the doped semiconductor sections to be individually contacted.

The invention furthermore relates to a method for the modulation of optical radiation, wherein the optical radiation is fed into an electro-optic modulator having at least one optical resonator, so that a standing optical wave is formed in the resonator, and at least two doped semiconductor sections which—as seen in the longitudinal direction of the resonator—are arranged at a distance from one another, and which respectively lie locally at an intensity minimum of the standing optical wave, are electrically driven.

Figure 2:
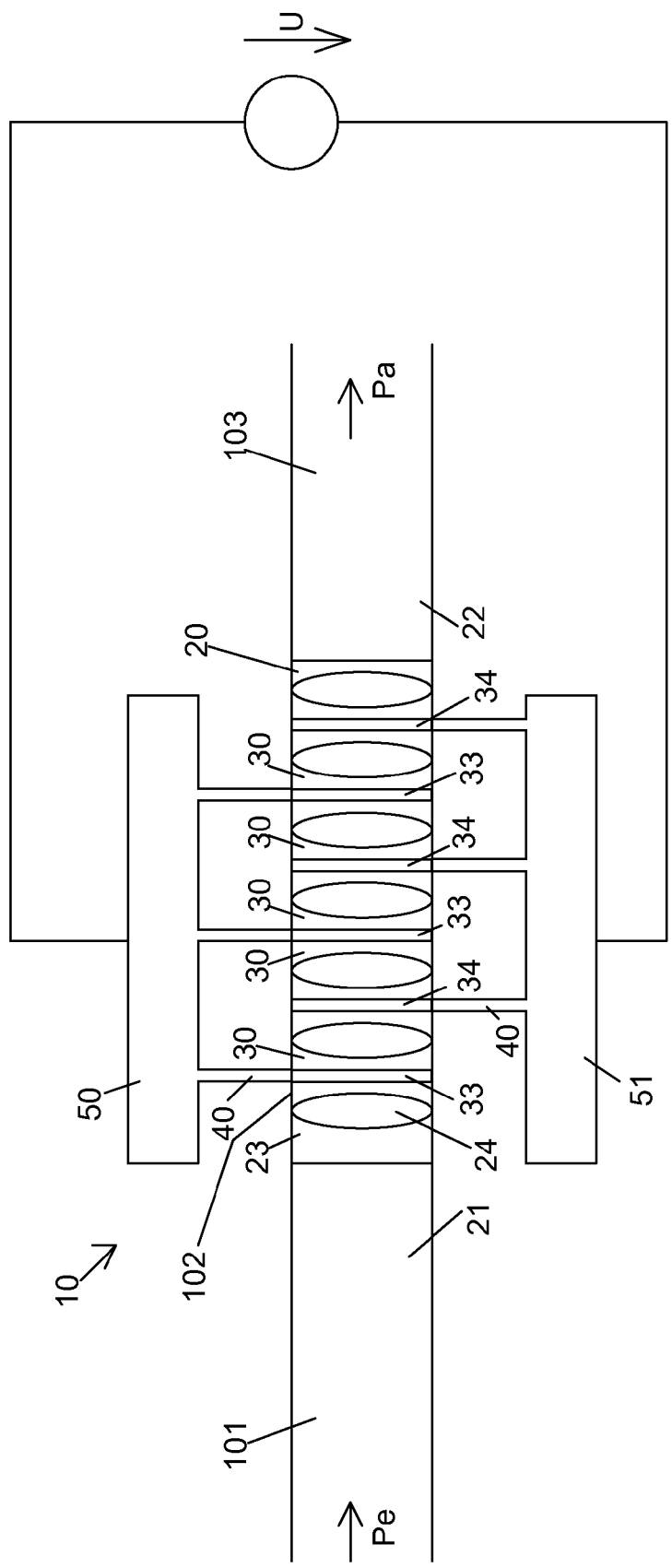
Figure 3:
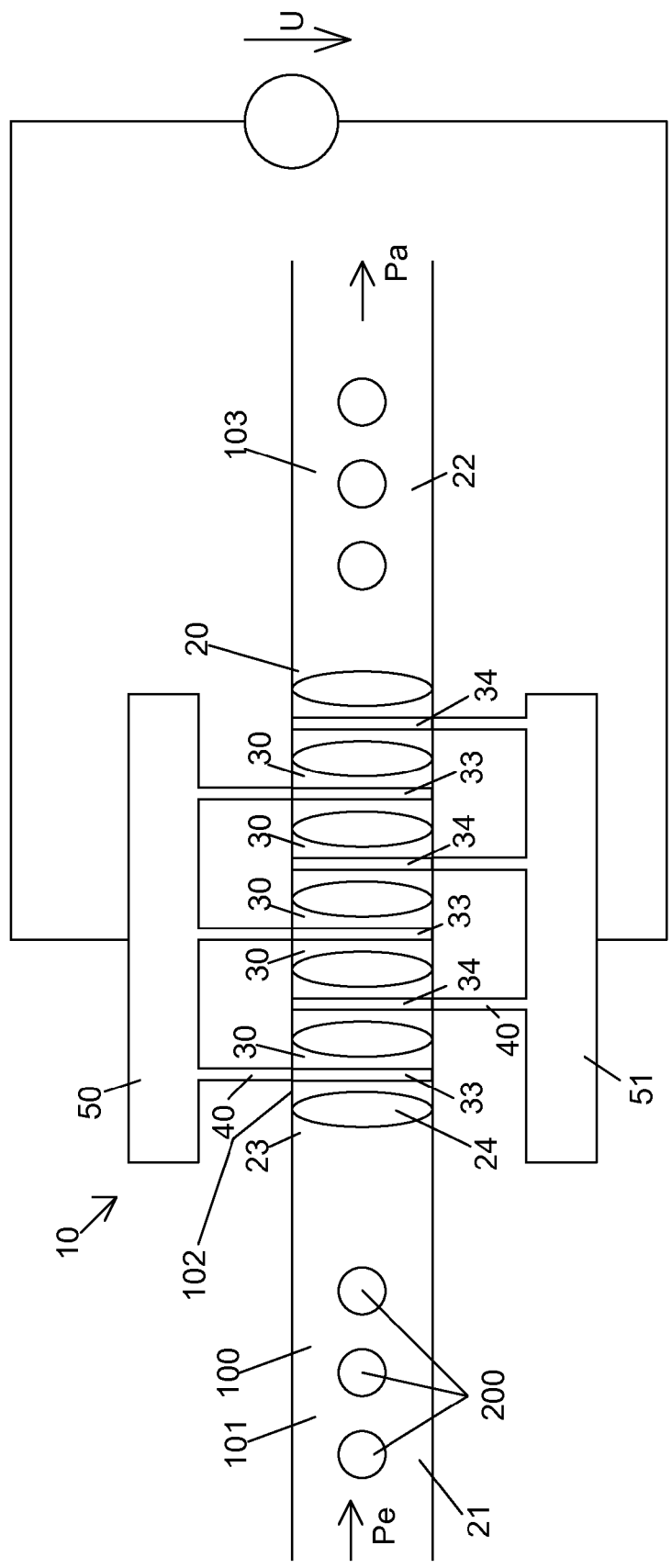
Figure 4:
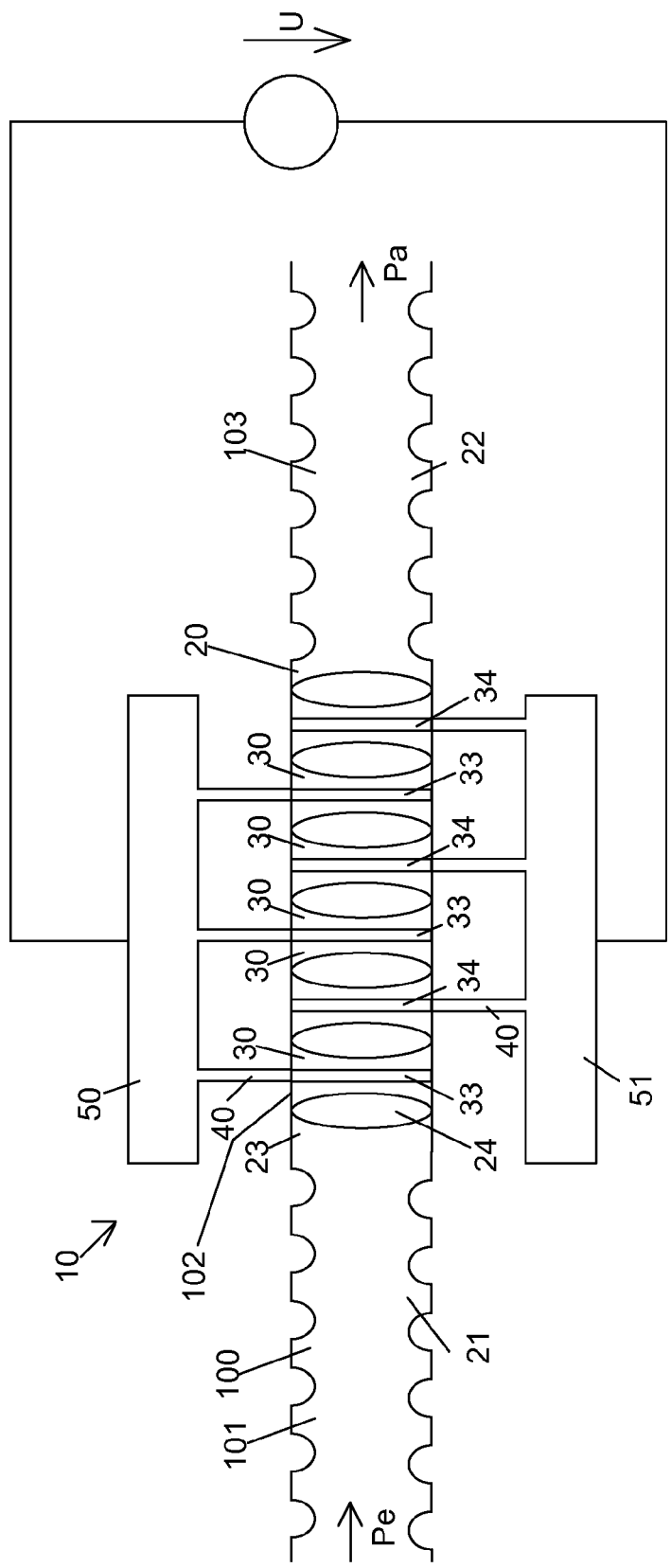
Figure 5:
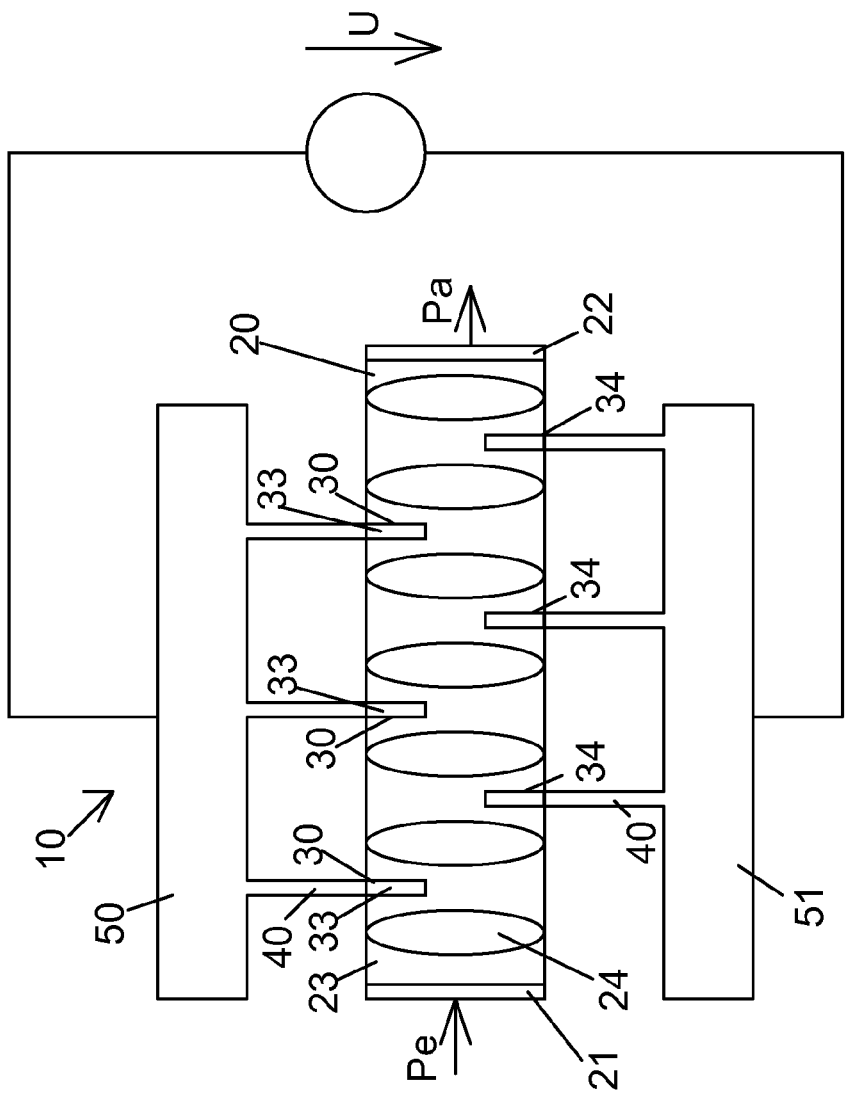

The invention will be explained in more detail below with the aid of exemplary embodiments; by way of example FIG. 1 shows a first exemplary embodiment of an electro-optic modulator according to the invention having two mirror layers for the formation of resonator boundaries, FIG. 2 shows a second exemplary embodiment of a modulator according to the invention, in which the resonator boundaries are formed by light waveguide sections, FIG. 3 shows a third exemplary embodiment of a modulator according to the invention, in which the mirrors of the resonator are formed by light waveguide sections in which there are holes, FIG. 4 shows a fourth exemplary embodiment of a modulator according to the invention, in which the mirrors of the resonator are formed by light waveguide sections whose width varies along the longitudinal direction of the light waveguide, and FIG. 5 shows a fifth exemplary embodiment of a modulator according to the invention.

In the figures, for the sake of clarity, the same references are always used for identical or comparable components.

FIG. 1 shows an electro-optic modulator 10, which comprises a resonator 20. The resonator boundaries of the resonator 20 are formed by two mirror sections 21 and 22. In the resonator 20 and between the two mirror sections 21 and 22, there is a light waveguide 23 which guides optical radiation incident with the amplitude Pe in the longitudinal direction of the resonator 20.

In FIG. 1, it can be seen that a standing optical wave is formed in the resonator 20. The maxima of this optical wave are visualized in FIG. 1 by ellipses, which are denoted by the reference 24.

Five diodes, which are denoted by the references 30, are arranged inside the resonator 20. Each of the diodes respectively comprises a p-doped semiconductor section, which is denoted by the reference 33, and an n-doped semiconductor section, which is denoted by the reference 34.

The diodes 30 are electrically connected in parallel and are connected via comb-like conductor tracks 42 to two contact terminals 50 and 51. The two contact terminals 50 and 51 have an electrical voltage U applied to them, with which the electro-optic modulator 20 is electrically driven and the resonant frequency of the resonator 20 is modulated.

The comb-like conductor tracks 40 are respectively formed by doped semiconductor material, the conductor tracks for contacting the p-doped semiconductor sections 33 being p-doped and the conductor tracks for contacting the n-doped semiconductor sections 34 being n-doped.

In order to prevent the comb-like conductor tracks 40 from attenuating the optical radiation in the light waveguide 23, the conductor tracks 40 are preferably perpendicular, or at least approximately perpendicular, to the longitudinal direction of the resonator 20 and therefore perpendicular, or at least approximately perpendicular, to the longitudinal direction of the waveguides 23.

Since the p-doped semiconductor sections 33 and the n-doped semiconductor sections 34 of the five diodes 30 respectively lie at an intensity minimum of the standing optical wave in the resonator 20, the optical wave remains substantially uninfluenced by the doping of these doped semiconductor sections.

If the diodes 30 are pin diodes, then the electro-optic modulator 10 is preferably operated in an injection mode. To this end, the diodes 30 are operated with the aid of a forward voltage in the forward direction, so that the p-doped semiconductor sections 33 and the n-doped semiconductor sections 34 inject charge carriers in the form of electrons and holes into the undoped or only lightly doped light waveguide sections lying between the doped semiconductor sections 33 and 34. This leads to a rise in the charge-carrier density and to a reduction in the refractive index and/or to an increase in the absorption in the light waveguide 23, and so the resonant frequency of the resonator 20 is detuned and the amplitude Pa of the optical wave leaving the resonator 20 is modified. By injection of charge carriers with the aid of a forward voltage, modulation of the optical radiation can therefore be achieved. In order to increase the modulation speed, after the injection of the charge carriers a reverse voltage may be applied to the diodes in order to extract the injected charge carriers.

If the region between the p-doped semiconductor sections 33 and the n-doped semiconductor sections 34 is likewise doped, so that the diodes 30 are pn diodes, then a reverse voltage is preferably applied to the diodes. Owing to a reverse voltage, the space charge zone respectively present between the doped semiconductor sections 33 and 34 is increased, and so a relatively large area with a very low charge-carrier density can be formed. If the reverse voltage is then modulated or modified, then the size of the space charge zone is also modified, which in turn leads to a change in the charge carrier density and the refractive index in the light waveguide 23, and therefore to detuning of the resonant frequency of the resonator 20. In this way, a modulation effect occurs in the form of modulation of the amplitude Pa of the optical radiation at the output of the resonator 20.

FIG. 2 shows a second exemplary embodiment of an electro-optic modulator. In this exemplary embodiment, there are three light waveguide sections 101, 102 and 103.

The first light waveguide section 101 forms a first mirror section 21 at the entry of the resonator 20. The third light waveguide section 103 forms a second mirror section 22 at the output of the resonator 20. The second light waveguide section 102 lies inside the resonator 20 and guides the optical radiation in the section between the two mirror sections 21 and 22.

The light waveguide sections 101 and 103 may for example comprise internal gratings, which are not shown in FIG. 2.

If optical radiation with the input amplitude Pe is shone into the first light waveguide section 101 and coupled into the resonator 20, then a standing wave is formed inside the resonator 20. The doped semiconductor sections 33 and 34 of the five diodes 30 lie in the regions between the intensity maxima, or in the sections with the intensity minima, of the optical wave, as already explained in detail in connection with FIG. 1. The diodes 30 are connected via comb-like conductor tracks 40, which extend perpendicularly away from the second light waveguide section 102, to contact terminals 50 and 51 via which an electrical voltage U can be applied to the electro-optic modulator 10.

If the charge carrier density in the resonator 20 is then modified by applying a forward voltage or a reverse voltage, than the amplitude Pa of the optical radiation at the output of the modulator 10 is also modified.

In this regard, reference is made to the comments above in connection with FIG. 1.

FIG. 3 shows a third exemplary embodiment of an electro-optic modulator 10. In this exemplary embodiment, there is a continuous SOI light waveguide 100, which comprises a first light waveguide section 101, a second light waveguide section 102 and a third light waveguide section 103.

In the first light waveguide section 101 and the third light waveguide section 103 of the SOI light waveguide 100, there are holes which are denoted by the reference 200. Owing to the holes 200, mirror sections 21 and 22, which form the resonator boundaries of the resonator 20, are formed in the SOI light waveguide 100. The functionality of the electro-optic modulator 10 according to FIG. 3 otherwise corresponds to the functionality of the electro-optic modulator according to FIG. 2, and so reference is made to the comments above in this regard.

FIG. 4 shows a fourth exemplary embodiment of an electro-optic modulator. In this exemplary embodiment, the edges of the SOI light waveguide 100 in the first light waveguide section 101 and in the third light waveguide section 103 are grooved, with the result that mirror sections 21 and 22 for the resonator 20 are formed. Owing to the grooving of the SOI light waveguide 100, a standing optical wave is formed in the resonator 20, which standing wave can be modulated by applying an electrical voltage U the contact terminals 50 and 51 of the electro-optic modulator 10, as already explained above in connection with FIGS. 1 to 3.

FIG. 5 shows an electro-optic modulator 10 which essentially corresponds to the electro-optic modulator 10 according to FIG. 1. In contrast thereto, in the electro-optic modulator 10 according to FIG. 5 the p-doped semiconductor sections 33 and the n-doped semiconductor sections 34 of the diodes 30 are free of overlap as seen in the direction of the wave propagation, that is to say in the longitudinal direction of the light waveguide 23. It can be seen that the p-doped semiconductor sections 33 and the n-doped semiconductor sections 34 respectively extend only about one third of the way into the light waveguide 23.

List of References 10 electro-optic modulator
20 resonator
21 mirror section
22 mirror section
23 light waveguide
24 intensity maximum of the standing wave
30 diodes
33 p-doped semiconductor section
34 n-doped semiconductor section
40 conductor track
50, 51 contact terminals
100 SOI light waveguide
101-103 light waveguide sections
200 holes
Pe incident optical radiation
Pa optical radiation at the output
U voltage

The invention claimed is:

1. An electro-optic modulator for the modulation of the optical radiation of a predetermined wavelength, the electro-optic modulator having at least one optical resonator in which a standing optical wave can be formed for the predetermined wavelength, wherein
 in the resonator, at least two doped semiconductor sections—as seen in the longitudinal direction of the resonator—are arranged at a distance from one another, and the at least two doped semiconductor sections respectively lie locally at an intensity minimum of the standing optical wave;
 wherein
 a light waveguide consisting of semiconductor material is present in the resonator,
 the longitudinal direction of the light waveguide extends along the longitudinal direction of the resonator, and
 the at least two doped semiconductor sections are respectively formed by a doped semiconductor section of the light waveguide.

2. The electro-optic modulator as claimed in claim 1, wherein all doped semiconductor sections of the light waveguide lie exclusively at intensity minima of the standing optical wave.

3. The electro-optic modulator as claimed in claim 1, wherein
 one of the at least two doped semiconductor sections is p-doped and the other is n-doped, and
 the doped semiconductor sections form a pn or pin diode, which extends along the longitudinal direction of the resonator.

4. The electro-optic modulator as claimed in claim 1, wherein the resonator respectively comprises a mirror section at its resonator boundaries.

5. The electro-optic modulator as claimed in claim 1 wherein the light waveguide is a silicon waveguide integrated in an SOI substrate.

6. An electro-optic modulator for the modulation of the optical radiation of a predetermined wavelength, the electro-optic modulator having at least one optical resonator in which a standing optical wave can be formed for the predetermined wavelength,
 wherein in the resonator, at least two doped semiconductor sections—as seen in the longitudinal direction of the resonator—are arranged at a distance from one another, and the at least two doped semiconductor sections respectively lie locally at an intensity minimum of the standing optical wave;
 wherein the resonator respectively comprises a mirror section at its resonator boundaries; and
 wherein at least one of the mirror sections is formed by a light waveguide section in which there are holes.

7. An electro-optic modulator for the modulation of the optical radiation of a predetermined wavelength, the electro-optic modulator having at least one optical resonator in which a standing optical wave can be formed for the predetermined wavelength,
 wherein the resonator, at least two doped semiconductor sections—as seen in the longitudinal direction of the resonator—are arranged at a distance from one another, and the at least two doped semiconductor sections respectively lie locally at an intensity minimum of the standing optical wave;
 wherein the resonator respectively comprises a mirror section at its resonator boundaries; and
 wherein at least one of the mirror sections is formed by a light waveguide section whose width and/or height varies.

8. An electro-optic modulator for the modulation of the optical radiation of a predetermined wavelength, the electro-optic modulator having at least one optical resonator in which standing optical wave can be formed for the predetermined wavelength,
 wherein the resonator, at least two doped semiconductor sections-as seen in the longitudinal direction of the resonator-are arranged at a distance from one another, and the at least two doped semiconductor section respectively lie locally at an intensity minimum of the standing optical wave;
 wherein the electro-optic modulator comprises a light waveguide consisting of semiconductor material, which forms a first mirror section of the resonator with a first section, is arranged inside the resonator with a second section and forms a second mirror section of the resonator with a third section.

* * * * *